US010155697B2

(12) United States Patent
Wang et al.

(10) Patent No.: US 10,155,697 B2
(45) Date of Patent: *Dec. 18, 2018

(54) COMPOSITE DIELECTRIC CERAMIC MATERIAL HAVING ANTI-REDUCTION AND HIGH TEMPERATURE STABILITY CHARACTERISTICS AND METHOD FOR PREPARING SAME

(71) Applicant: HOLY STONE ENTERPRISE CO., LTD., Taipei (TW)

(72) Inventors: Sea-Fue Wang, Taipei (TW); Jian-Hua Li, Taipei (TW); Yen-Po Hung, Taipei (TW); Yuan-Cheng Lai, Taoyuan County (TW)

(73) Assignee: HOLY STONE ENTERPRISE CO., LTD., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/468,876

(22) Filed: Mar. 24, 2017

(65) Prior Publication Data

US 2017/0204012 A1 Jul. 20, 2017

Related U.S. Application Data

(63) Continuation-in-part of application No. 15/152,045, filed on May 11, 2016, now Pat. No. 9,708,223, (Continued)

(30) Foreign Application Priority Data

Mar. 22, 2012 (TW) .............................. 101109970 A
Jun. 9, 2014 (TW) .............................. 103119920 A
Jul. 19, 2016 (TW) .............................. 105122739 A

(51) Int. Cl.
C04B 35/468 (2006.01)
H01G 4/12 (2006.01)
(Continued)

(52) U.S. Cl.
CPC ........ *C04B 35/4682* (2013.01); *C04B 35/468* (2013.01); *C04B 35/495* (2013.01);
(Continued)

(58) Field of Classification Search
CPC .................................................. C04B 35/4682
See application file for complete search history.

(56) References Cited

U.S. PATENT DOCUMENTS 6,426,018 B1    7/2002  Takahashi et al.
6,673,274 B2 *  1/2004  Venigalla ................ B32B 18/00
                                                    252/570
(Continued)

FOREIGN PATENT DOCUMENTS

JP      2003081675    3/2003
TW      I397090       5/2013
TW      201340146     10/2013

*Primary Examiner* — Karl E Group
(74) *Attorney, Agent, or Firm* — Muncy, Geissler, Olds & Lowe, P.C.

(57) ABSTRACT

A composite dielectric ceramic material having anti-reduction and high temperature stability characteristics includes the main component of $(1-x)(BaTiO_3)-x(Ba_2LiTa_5O_{15})$ formulated in accordance with the relative molar ratio of up to 100 mole composite dielectric ceramics and a predetermined ratio of one or multiple oxide subcomponents corresponding to 100 moles of the main component. The oxide subcomponents of $Li_2TiO_3$, $BaSiO_3$, $(Ba_{0.6}Ca_{0.4})SiO_3$ and $SiO_2$ can be used as sintering aids to provide a sintering promotion effect. The oxide subcomponents of CaO, MnO, MgO can also be selected used to improve dielectric stability. More particularly, CaO has the advantages of improving the anti-reduction ability and increasing the coefficient of resistance. Therefore, with the adding of the oxide subcomponents and their interactions, the rate of change of the TCC curve of the composite dielectric ceramic material $(1-x)(BaTiO_3)-x(Ba_2LiTa_5O_{15})$ in the temperature range of −55°
(Continued)

C.~200° C. is significantly inhibited, and its dielectric constant (k-values) is also well improved.

3 Claims, 8 Drawing Sheets

Related U.S. Application Data which is a continuation of application No. 14/577,905, filed on Dec. 19, 2014, now Pat. No. 9,365,458, which is a continuation-in-part of application No. 13/569,616, filed on Aug. 8, 2012, now Pat. No. 9,023,748.

(51) Int. Cl.
*C04B 35/626* (2006.01)
*C04B 35/638* (2006.01)
*C04B 35/64* (2006.01)
*C04B 35/495* (2006.01)
*H01G 4/30* (2006.01)
*H01B 3/12* (2006.01)

(52) U.S. Cl.
CPC ...... *C04B 35/62695* (2013.01); *C04B 35/638* (2013.01); *C04B 35/64* (2013.01); *H01B 3/12* (2013.01); *H01G 4/1227* (2013.01); *H01G 4/1254* (2013.01); *H01G 4/30* (2013.01); *C04B 2235/3201* (2013.01); *C04B 2235/3203* (2013.01); *C04B 2235/3206* (2013.01); *C04B 2235/3208* (2013.01); *C04B 2235/3215* (2013.01); *C04B 2235/3229* (2013.01); *C04B 2235/3231* (2013.01); *C04B 2235/3232* (2013.01); *C04B 2235/3236* (2013.01); *C04B 2235/3251* (2013.01); *C04B 2235/3255* (2013.01); *C04B 2235/3262* (2013.01); *C04B 2235/3436* (2013.01); *C04B 2235/3454* (2013.01); *C04B 2235/96* (2013.01)

(56) References Cited

U.S. PATENT DOCUMENTS

| | | | |
|---|---|---|---|
| 6,783,588 B2 | 8/2004 | Aoto et al. | |
| 6,793,843 B2 | 9/2004 | Furukawa et al. | |
| 7,541,306 B2 | 6/2009 | Koebrugge et al. | |
| 7,751,178 B2 | 7/2010 | Suzuki | |
| 7,821,770 B2 | 10/2010 | Nishikawa et al. | |
| 8,194,392 B2 | 6/2012 | Malhan et al. | |
| 8,411,412 B2 * | 4/2013 | Chan | C04B 35/4682 361/321.4 |
| 9,023,748 B2 * | 5/2015 | Wang | C04B 35/468 501/137 |
| 9,064,635 B2 * | 6/2015 | Wang | C04B 35/468 |
| 9,365,458 B2 * | 6/2016 | Wang | C04B 35/4682 |
| 9,708,223 B2 * | 7/2017 | Wang | C04B 35/4682 |
| 2003/0125193 A1 | 7/2003 | Kobayashi et al. | |
| 2004/0248724 A1 * | 12/2004 | Venigalla | B82Y 30/00 501/137 |
| 2008/0253060 A1 * | 10/2008 | Ito | B32B 18/00 361/321.4 |
| 2009/0036293 A1 | 2/2009 | Shimada et al. | |
| 2009/0105064 A1 | 4/2009 | Shimada et al. | |
| 2009/0246508 A1 * | 10/2009 | Takano | B82Y 30/00 428/325 |
| 2011/0176253 A1 * | 7/2011 | Chan | C04B 35/4682 361/321.4 |
| 2012/0238438 A1 * | 9/2012 | Endo | C04B 35/465 501/152 |
| 2013/0250482 A1 * | 9/2013 | Wang | C04B 35/468 361/321.4 |
| 2015/0009604 A1 * | 1/2015 | Wang | C04B 35/468 361/301.4 |
| 2015/0111719 A1 * | 4/2015 | Wang | C04B 35/4682 501/137 |
| 2016/0251266 A1 * | 9/2016 | Wang | C04B 35/4682 501/137 |

* cited by examiner

COMPOSITE DIELECTRIC CERAMIC MATERIAL HAVING ANTI-REDUCTION AND HIGH TEMPERATURE STABILITY CHARACTERISTICS AND METHOD FOR PREPARING SAME

CROSS REFERENCE TO RELATED APPLICATIONS

This application is a Continuation-in-part of co-pending application Ser. No. 15/152,045, filed on May 11, 2016, which issued as U.S. Pat. No. 9,708,223 on Jul. 18, 2017 and which is a Continuation of application Ser. No. 14/577,905, filed on Dec. 19, 2014, which issued as U.S. Pat. No. 9,365,458 on Jun. 14, 2016 and which is a Continuation-In-Part of application Ser. No. 13/569,616, filed on Aug. 8, 2012, which issued as U.S. Pat. No. 9,023,748 on May 5, 2015; for which priority is claimed under 35 U.S.C. § 120, the entire contents of all of which ares hereby incorporated by reference.

This application claims the priority benefit of application Ser. No. 13/569,616 filed in United States on Aug. 8, 2012, Application No. 101109970 filed in Taiwan on Mar. 22, 2012, Application No. 103119920 filed in Taiwan on Jun. 9, 2014 and Application No. 105122739 filed in Taiwan on Jul. 19, 2016.

BACKGROUND OF THE INVENTION

1. Field of the Invention

The present invention relates to ceramic material technology and more particularly, to a composite dielectric ceramic material having anti-reduction and high temperature stability characteristics that can be used in composite dielectric ceramic material systems for conventional charge storage-related table capacitors and multilayer ceramic capacitors, and can also be applied to the fabrication of base metal electrode and noble metal electrode. A capacitor made by using this composite dielectric ceramic material shows excellent dielectric stability in the temperature range of −55° C.~200° C., and satisfy EIA-X9R specification. The invention relates also to the production of the aforesaid composite dielectric ceramic material.

2. Description of the Related Art

With the rapid development of technology, the direction of development of capacitor goes toward miniaturization, high capacity, high stability and high reliability. Nowadays, chip-based multilayer ceramic capacitor (MLCC) has been intensively used to substitute conventional capacitors, not only to reduce the size and increase the capacitor capacitance, but also to reduce the production costs. Currently, the most commonly available high-capacity capacitors on the market are electrolytic capacitors for the advantage of ultra high dielectric constant, easily covering all your high capacity needs. However, these capacitors have high dielectric loss, and are susceptible to thermal degradation which ultimately may result in failure.

However, due to the continuous breakthroughs in sophisticated production equipment and process technology, multilayer ceramic capacitors have been significantly improved to reduce their volume and to meet high capacity needs, so part of electrolytic capacitors has gradually been replaced by multilayer ceramic capacitors. When reviewing the current electronic products, such as: computers, mobile phones, automotive electronic components, the mostly commonly and most widely used capacitors are multilayer ceramic capacitors, and followed by tablet type ceramic capacitors.

According to different applications and electrical characteristics, US Electronic Industries Association (EIA) summarized capacitors as Class I temperature compensating type capacitors and Class II high dielectric constant capacitors. The following Table I illustrates a capacitor specification constructed subject US Electronic Industries Association (EIA) Class II. For the advantage of high dielectric temperature stability, X8S (−55° C.~150° C., $\Delta C/C \leq 22\%$) multilayer ceramic capacitor has been widely used in miniature electronic components and vehicles under a high temperature variation environment. Automobile electronic devices, such as engine control unit (ECU), anti-lock braking system ABS and proprietary digital electronic fuel injection system (PGMFI), need to operate in a fairly harsh environmental condition. Therefore, for safety reasons, when a multilayer ceramic capacitor to be applied to this fairly harsh environmental condition, it needs to have a more stable and higher temperature range (higher than 150°) of dielectric characteristic. Capacitor with ultra-high temperature stability will be essential elements for electronic systems for high temperature operation.

TABLE I

US EIA Class II Capacitor Specification Table

| Low Temp. Symbol | High Temp. Symbol | Max. % ΔC Symbol |
|---|---|---|
| −55° C. X | +45° C. 3 | ±1.0% A |
| −30° C. Y | +65° C. 4 | ±1.2% B |
| −10° C. Z | +85° C. 5 | ±2.2% C |
|  | +105° C. 6 | ±3.3% D |
|  | +125° C. 7 | ±4.7% E |
|  | +150° C. 8 | ±7.5% F |
|  | +200° C. 9 | ±10.0% P |
|  |  | ±15.0% R |
|  |  | ±22.0% S |
|  |  | +22%/−33% T |
|  |  | +22%/−56% U |
|  |  | +22%/−82% V |

Ex.: X7R -55~125° C..±15%
Y5V -30~+85° C.+22%/-82%

Further, Barium Titanate (BaTiO$_3$) has excellent dielectric characteristic, and is often used as composite dielectric ceramic material for capacitor. However, in order to fit different application requirements, modifying agents may be selectively added to alter the electrical characteristics of barium titanate (BaTiO$_3$). U.S. Pat. No. 7,751,178 discloses a ceramic dielectric of which the static capacitance-temperature characteristics can satisfy EIA-X8R specifications. This dielectric ceramic includes a perovskite type compound represented by composition formula $(Ba_{1-x-y}Ca_xSn_y)m(Ti_{1-z}Zr_z)O_3$ (where x, y, z, and m satisfy $0.9990 \leq m \leq 1.015$, $0 \leq x \leq 0.20$, $0.02 \leq y \leq 0.20$, $0 \leq z \leq 0.05$ respectively) as a primary component; and RE as an accessory component (where RE is at least one selected from the group consisting of Y, La, Ce, Pr, Nd, Sm, Eu, Gd, Tb, Dy, Ho, Er, Tm, Yb, and Lu), wherein 0.5 to 20 molar parts of RE is contained with respect to 100 molar parts of the primary component. In short, using modifying agents and trace elements to improve barium titanate dielectric properties is considered a more feasible approach.

In particular, U.S. patent application Ser. No. 14/577,905, filed by the present inventor, discloses a composite dielectric ceramic material that satisfies EIA-X8R and X9R specifications. This composite dielectric ceramic material includes the composite ceramic powder of (1-x) $BaTiO_3$-$xBa_2LiTa_5O_{15}$ and (1-x)$BaTiO_3$-$xBa_2LiNb_5O_{15}$. This invention also discloses a design principle for the preparation of a dielectric ceramic material that is highly stable in the temperature range of −55° C.~200° C. At the formula of (1-x)$BaTiO_3$-$xBa_2LiTa_5O_{15}$, x=0.01~0.50. This high temperature stable composite dielectric ceramic material design principle is based on the viewpoint of composite material to prepare a composite phase by mixing a dielectric material of high Curie temperature with a dielectric material of low Curie temperature. These two dielectric materials compensate for each other, and stabilize the changing rate of dielectric constant against temperature. $Ba_2LiTa_5O_{15}$ belongs to low dielectric constant material. Although increasing the content of $Ba_2LiTa_5O_{15}$ can effectively enhance the temperature stability of the dielectric material, but it would dilute the value of the dielectric constant K. This problem of lowered dielectric constant will lead to raised high-capacity capacitor design threshold, making the design not easy to achieve. Therefore, it is desirable to find a measure for producing a composite dielectric ceramic material having the characteristics of temperature stability and good dielectric constant by adding a predetermined proportion of metal oxides.

SUMMARY OF THE INVENTION

The present invention has been accomplished under the circumstances in view. The present invention provides a composite dielectric ceramic material having anti-reduction and high temperature stability characteristics, which is practical for use under the temperature environment between −55° C.~200° C. In the composite dielectric ceramic material based on (1-x)$BaTiO_3$-$xBa_2LiTa_5O_{15}$, the interaction between high dielectric constant $BaTiO_3$ and low dielectric constant $Ba_2LiTa_5O_{15}$ enhances characteristic of dielectric temperature stability. Increasing the amount of $Ba_2LiTa_5O_{15}$ significantly increases the TCC curve stability of the (1-x) $BaTiO_3$-$xBa_2LiTa_5O_{15}$ composite dielectric ceramic material system between −55° C.~200° C., making it in line with EIA-X9R specification. However, because $Ba_2LiTa_5O_{15}$ is a low dielectric constant material, increasing the amount of $Ba_2LiTa_5O_{15}$ can relatively lower the dielectric constant. Subject to the interaction among subcomponents, the invention enables the (1-x)$BaTiO_3$-$xBa_2LiTa_5O_{15}$ composite dielectric ceramic material system to be in line with EIA-X9R specification and to have enhanced anti-reduction ability and high coefficient of resistance with high application stability after added a proper amount of $Ba_2LiTa_5O_{15}$.

It is the main object of the present invention to provide a composite dielectric ceramic material, which comprises a main component of (1-x)($BaTiO_3$)-x($Ba_2LiTa_5O_{15}$) formulated in accordance with the relative molar ratio of up to 100 mole where x=0.03~0.50, and a predetermined ratio of one or multiple oxide subcomponents corresponding to 100 moles of the main component. The oxide subcomponents can be ternary oxide, binary oxide or unary oxide subcomponents, enabling the composite dielectric ceramic material to have anti-reduction ability. In one embodiment of the present invention, the composite dielectric ceramic material comprises the main component comprises of $BaTiO_3$ and $Ba_2LiTa_5O_{15}$, and a special oxide subcomponent. On the base of 100 moles of the total main components, the amount of the oxide subcomponent is between 0.1~30 moles. The added oxide subcomponent can improve the problem of reduced dielectric constant (k-value) while prohibiting the range of variation of the TCC curved between 150° C.~200° C. without causing any significant change in the original characteristics of the dielectric ceramic material. In contrast to many other dielectric ceramic materials that use single phase microstructures to improve temperature stability and dielectric constant properties, the invention is fundamentally different from the conventional dielectric ceramic materials.

When a binary oxide subcomponent is selected and used as sintering aid, the binary oxide subcomponent can be $Li_2TiO_3$ or $BaSiO_3$. If $BaSiO_3$ is selected, the added amount between 0.1~10.0 moles is sufficient to effectively solve the problem of reduced dielectric constant (k-value). However, for the purpose of freedom of formulation ratio, $Li_2TiO_3$ provides a more extensive modulation freedom because $Li_2TiO_3$ does not produce other adverse effects on the dielectric ceramic material when its added amount reaches about 30 moles. Thus, in one embodiment of the present invention, the composite dielectric ceramic material comprises a main component of (1-x)($BaTiO_3$)-x($Ba_2LiTa_5O_{15}$) formulated in accordance with the relative molar ratio of up to 100 mole, and a predetermined ratio of one or multiple oxide subcomponents corresponding to 100 moles of the main component; when the oxide subcomponent of $Li_2TiO_3$ is selected, the added amount is in the range of 0.1~30 moles; when the oxide subcomponent of $BaSiO_3$ is selected, the added amount is in the range of 0.1~10 moles.

Further, when the ternary subcomponent of ($Ba_{0.6}Ca_{0.4}$)$SiO_3$ is used as a sintering aid, the added amount is in the range of 0.1~10 moles to show optimal effect in improving the problem of reduced dielectric constant (k-value). Thus, in another embodiment of the present invention, the composite dielectric ceramic material comprises a main component of (1-x)($BaTiO_3$)-x ($Ba_2LiTa_5O_{15}$) formulated in accordance with the relative molar ratio of up to 100 mole, and a predetermined ratio of ternary oxide subcomponent ($Ba_{0.6}Ca_{0.4}$)$SiO_3$ corresponding to 100 moles of the main component; wherein the added amount of ternary oxide subcomponent ($Ba_{0.6}Ca_{0.4}$)$SiO_3$ is in the range of 0.1~10 moles. Differences between ternary oxide subcomponent and binary oxide subcomponent will be reflected in the subsequent process step, microstructure change or mechanical property performance after sintering. Selection of ternary or binary oxide subcomponents can be determined depending on different environmental conditions of equipment or powder material restrictions. However, ternary oxide and binary oxide subcomponents shall be included within the scope of the present invention.

Further, ternary or binary oxide constituent elements are usually more complex. If other additives or intermediates can cause unexpected chemical reaction with the constituent elements of the ternary or binary oxides during the manufacturing process due to certain process conditions, avoid choosing the ternary or binary oxide as a sintering aid, and use a simple unary oxide, for example, $SiO_2$ as a substitute. In this case, the added amount of $SiO_2$ between 0.1~10.0 moles can get good results. Therefore, in still another embodiment of the present invention, the composite dielectric ceramic material comprises a main component of (1-x) ($BaTiO_3$)-x($Ba_2LiTa_5O_{15}$) formulated in accordance with the relative molar ratio of up to 100 mole, and a predetermined ratio of oxide subcomponent $SiO_2$ corresponding to 100 moles of the main component; wherein the added amount of oxide subcomponent $SiO_2$ is preferable in the range of 0.1~10.0 moles, or most preferably between 0.1~5.0 moles.

Further, when adding another unary oxide subcomponent or multiple other unary oxide subcomponents, such as CaO, MnO or MgO between 0.1~10.0 moles, a good high-temperature anti-reduction effect can be achieved. Preferably, the added amount is between 0.1~8.0 moles, enabling the dielectric ceramic material to exhibit electrical characteristics. If CaO is selected, the high-temperature anti-reduction characteristic significantly lifts the coefficient of resistance. Further, increasing the amount of $Li_2TiO_3$ can also enhance the dielectric temperature stability and improve the problem of reduced dielectric constant (k-value).

Further, the main component of the composite dielectric ceramic material in accordance with the present invention comprises $BaTiO_3$ and $Ba_2LiTa_5O_{15}$. Further, the additive of oxide subcomponent can be one or multiple unary oxides such as CaO, MnO, MgO or $SiO_2$. The added unary oxide subcomponent does not cause any change in the characteristics of the composite phase of the composite dielectric ceramic material. The amount of the unary oxide subcomponent is preferably between 0.1~8.0 moles corresponding to 100 moles main component. Unlike the technical measure of adding a ternary oxide to increase the dielectric constant (k-value), when strictly controlled the content of $Ba_2LiTa_5O_{15}$ and added a proper amount of the unary oxide subcomponent of CaO, MnO, MgO or $SiO_2$, the test results barely approach the object of the present invention. However, the content of $Ba_2LiTa_5O_{15}$ and unary oxide subcomponent must be strictly and accurately controlled, otherwise adverse effects on the electrical characteristics of the dielectric ceramic material in the manufacturing process can be produced. Therefore, in still another embodiment of the present invention, the composite dielectric ceramic material comprises a main component of $(1-x)(BaTiO_3)$-$x(Ba_2LiTa_5O_{15})$ formulated in accordance with the relative molar ratio of up to 100 mole, and a predetermined ratio of unary oxide subcomponent selected from the group of CaO, MnO, MgO, $SiO_2$ and their combinations corresponding to 100 moles of the main component; wherein the added amount of the unary oxide subcomponent is preferable in the range of 0.1~10.0 moles, or most preferably between 0.1~8.0 moles.

In still another embodiment of the present invention, the composite dielectric ceramic material comprises a main component composed of $BaTiO_3$ and $Ba_2LiTa_5O_{15}$ and formulated in accordance with the relative molar ratio of up to 100 mole, and a 0.1~30 moles oxide subcomponent corresponding to 100 moles of the main component; wherein the oxide subcomponent is selected from one of the combinations of $Li_2TiO_3$, $BaSiO_3$ and $(Ba_{0.6}Ca_{0.4})SiO_3$. The main component and the oxide subcomponent are mixed to form an initial powder. The initial powder is then sintered to form the desired dielectric ceramic material. Further, another unary oxide powder selected from the group of MnO, MgO, CaO, $SiO_2$ and their combinations can be added to the initial powder before sintering, enabling the dielectric ceramic material to provide a high-temperature anti-reduction characteristic. The content of added unary oxide powder is preferable in the range of 0.1~10.0 moles, or most preferably between 0.1~8.0 moles.

In still another embodiment of the present invention, the composite dielectric ceramic material comprises a main component composed of $BaTiO_3$ and $Ba_2LiTa_5O_{15}$ and formulated in accordance with the relative molar ratio of up to 100 mole, and a 0.1~10 moles oxide subcomponent selected from the group of MnO, MgO, CaO, $SiO_2$ and their combinations corresponding to 100 moles of the main component. The initial powder of the mixture of the listed components is then sintered to form the desired composite dielectric ceramic material that exhibits temperature coefficient of capacitance (TCC) stability and high dielectric constant (k-value).

The aforesaid terms of "ternary", "binary" or "unary" is defined subject to the number of other no-oxygen constituent elements like the materials science naming rules, such as binary and ternary alloy phase diagrams, but not based on the organic chemistry naming rules to define the name by the number of functional groups, or the tariff number after decomposition.

The composite dielectric ceramic material of the present invention can effectively promote the sintering densification and improve anti-reduction ability. With the increase of the added amount, the rate of change of the TCC curve is prohibited and stabilized. Thus, the composite dielectric ceramic material in accordance with the present invention can be prepared under a low oxygen partial pressure environment, and the prepared composite dielectric ceramic material has anti-reduction characteristic. The composite dielectric ceramic material of the present invention can be applied to the fabrication of base metal electrodes to eliminate the problem of semiconductor deterioration of the insulating characteristic of ceramic material. Further, the composite dielectric ceramic material is practical for EIA-compliant specification.

Other advantages and features of the present invention will be fully understood by reference to the following specification in conjunction with the accompanying drawings.

DETAILED DESCRIPTION OF THE PREFERRED EMBODIMENT

Referring to FIGS. 1~4, a tablet type capacitor preparation flow chart, a sectional view of a tablet type capacitor, a multilayer ceramic capacitor (MLCC) preparation flow chart and a sectional view of a multilayer ceramic capacitor (MLCC) are illustrated. As illustrated, during the preparation of a tablet type ceramic capacitor, prepare an initial powder material by mixing main components ($BaTiO_3$ and $Ba_2LiTa_5O_{15}$) and at least one oxide subcomponent ($Li_2TiO_3$, $BaSiO_3$, $(Ba_{0.6}Ca_{0.4})SiO_3$, $SiO_2$, MgO, MnO and CaO) according to the formulas of Table 2 and Table 3, and calculating the molar number of each component based on the measurement unit of 100 moles. After preparation of tablet type ceramic capacitor samples, measure the dielectric characteristics or other electrical characteristics of the ceramic capacitor samples. In the preparation, $BaTiO_3$ can be obtained by chemical reaction from $BaCO_3$ and $TiO_2$; $Ba_2LiTa_5O_{15}$ can be obtained by chemical reaction from $BaCO_3$, $Li_2CO_3$ and $Ta_2O_5$; $Li_2TiO_3$ can be obtained by chemical reaction from $Li_2CO_3$ and $TiO_2$; $BaSiO_3$ can be obtained by chemical reaction from $BaCO_3$ and $SiO_2$; $(Ba_{0.6}Ca_{0.4})SiO_3$ can be obtained by chemical reaction from $BaCO_3$, $CaCO_3$ and $SiO_2$.

Figure 1:
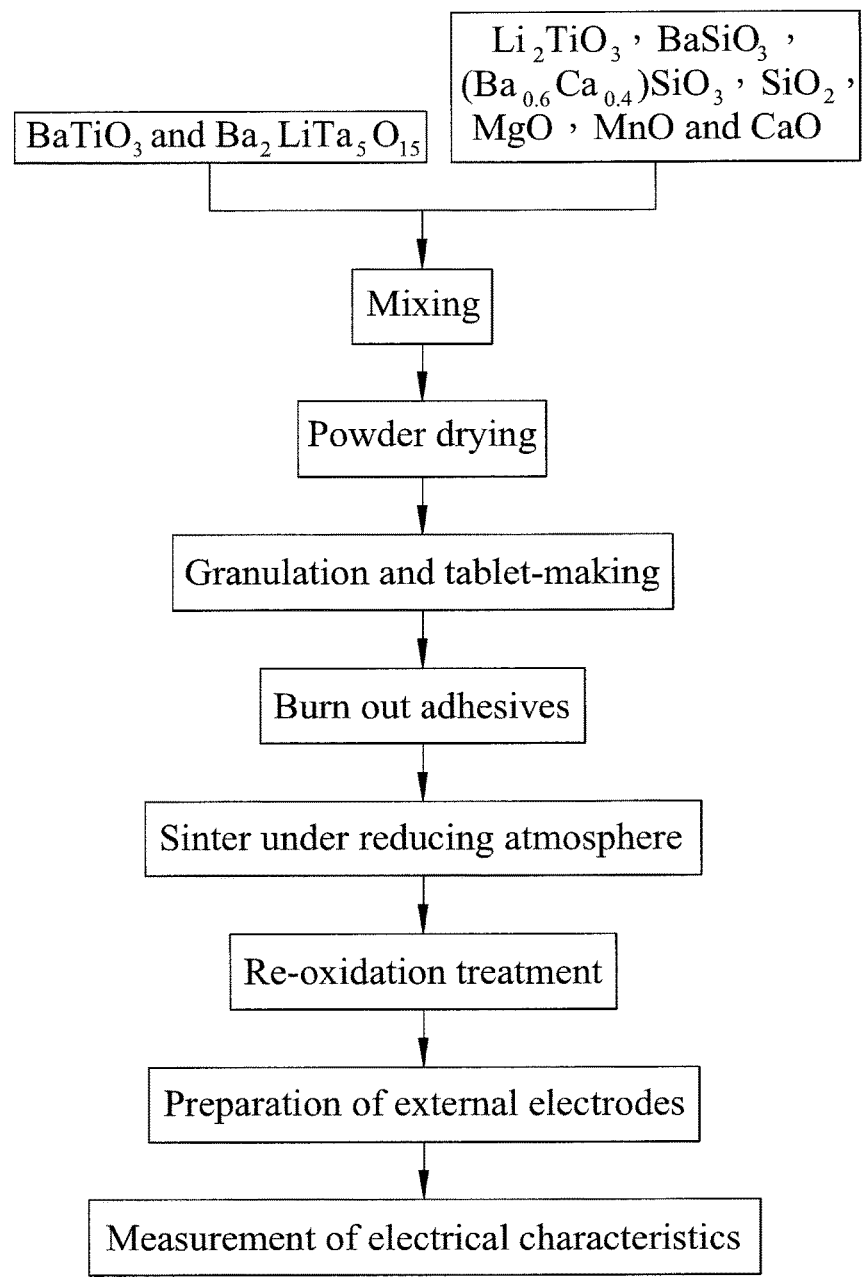
FIG. 1 is a tablet type capacitor preparation flow chart in accordance with the present invention.
Figure 2:
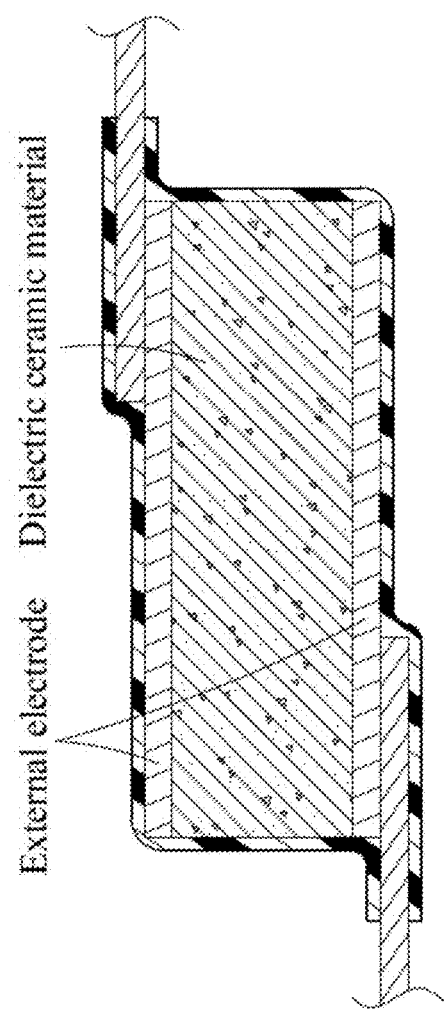
FIG. 2 is a sectional view of a tablet type capacitor made according to the present invention.

Referring to FIG. 1 and FIG. 2 again, 20 g composite dielectric ceramic powder prepared subject to Table 2 is put in a cylindrical polyethylene bottle of diameter 50 mm and volume 200 ml, and then 200 g Zirconia oxide balls of diameter 3 mm are put in the cylindrical polyethylene bottle for use as grinding elements, and then ethanol is added to the cylindrical polyethylene bottle for use as a mixed solvent, and then the cylindrical polyethylene is rotated at 360 rpm for 6~12 hours to well mix the dielectric ceramic powder.

The well mixed dielectric ceramic powder is then dried at 80° C. Thereafter, prepare a ceramic embryogenic tablet by: adding 5 wt % polyvinyl alcohol (PVA) aqueous binder (water solution prepared by 15 wt % PVA and 85 wt % pure water) to the prepared dielectric ceramic powder, and then well mixing the applied materials to enhance powder formability, and then using a 80 mesh stainless steel screen prepared subject to the specifications of American Society for Testing and Materials (ASTM) to screen the powder material, and then taking 0.4 g of the screened powder to cast a round embryogenic tablet of diameter 10 mm using an uniaxial molding method, and then heating the round embryogenic tablet under the atmosphere environment at 550° C. for 4 hours (at the heating rate of 5° C./min) to burn out polyvinyl alcohol (PVA) aqueous binder, and then sintering the round embryogenic tablet under a reducing atmosphere composed of 98% $N_2$-2% $H_2$ and 35° C. saturated water vapor at 1000° C.~1400° C. (at the heating rate of 5° C./min) for 2 hours, and then applying an reoxidation heat treatment to the sintered ceramic body under 60 ppm~150 ppm or the atmospheric environment at 900° C.~1050° C. (at the heating rate of 5° C./min), and then using a screen-printing technique to print Ag, Cu or Ni on the sintered ceramic body so as to form an electrode on each of two opposite parallel sides of the sintered ceramic body. Tablet type capacitor samples (see FIG. 2) can thus be prepared.

TABLE 2

Formula & Dielectric Characteristic Table

| Sample | EIA Spec. | $BaTiO_3$ | $Ba_2LiTa_5O_{15}$ | $Li_2TiO_3$ | $BaSiO_3$ | $(Ba_{0.6}Ca_{0.4})SiO_3$ | MgO | MnO |
|---|---|---|---|---|---|---|---|---|
| 1 | X8S | 97.00 | 3.00 | — | — | — | — | — |
| 2 | X8R | 95.00 | 5.00 | — | — | — | — | — |
| 3 | X9R | 90.00 | 10.00 | — | — | — | — | — |
| 4 | X9R | 87.50 | 12.50 | — | — | — | — | — |
| 5 | X9R | 85.00 | 15.00 | — | — | — | — | — |
| 6 | X9R | 80.00 | 20.00 | — | — | — | — | — |
| 7 | X9S | 74.00 | 26.00 | — | — | — | — | — |
| 8 | X9T | 70.00 | 30.00 | — | — | — | — | — |
| 9 | X9T | 60.00 | 40.00 | — | — | — | — | — |
| 10 | X9T | 50.00 | 50.00 | — | — | — | — | — |
| 11 | X8R | 97.73 | 2.27 | 4.55 | — | — | — | — |
| 12 | X8R | 96.34 | 3.66 | 7.32 | — | — | — | — |
| 13 | X8R | 94.74 | 5.26 | 1.00 | — | — | — | — |
| 14 | X8R | 94.74 | 5.26 | 3.00 | — | — | — | — |
| 15 | X8R | 94.74 | 5.26 | 5.00 | — | — | — | — |
| 16 | X8R | 94.74 | 5.26 | 7.00 | — | — | — | — |
| 17 | X8R | 94.74 | 5.26 | 10.53 | — | — | — | — |
| 18 | X9R | 92.86 | 7.14 | 14.29 | — | — | — | — |
| 19 | X9R | 92.01 | 7.99 | 15.98 | — | — | — | — |
| 20 | X9R | 87.93 | 12.07 | 24.14 | — | — | — | — |
| 21 | X8R | 94.74 | 5.26 | — | 2.31 | — | — | — |
| 22 | X7R | 94.74 | 5.26 | — | 4.62 | — | — | — |
| 23 | X8R | 94.74 | 5.26 | — | — | 2.25 | — | — |
| 24 | X8R | 94.74 | 5.26 | — | — | 4.50 | — | — |
| 25 | X8R | 97.73 | 2.27 | 1.70 | — | — | — | — |
| 26 | X8R | 94.74 | 5.26 | 3.95 | — | — | — | — |
| 27 | X9R | 92.01 | 7.99 | 15.98 | — | — | — | — |
| 28 | X9R | 92.01 | 7.99 | 15.98 | — | — | — | — |
| 29 | X8R | 92.01 | 7.99 | 15.98 | — | — | — | — |
| 30 | X8R | 90.62 | 9.38 | 7.04 | — | — | — | — |
| 31 | X8R | 92.86 | 7.14 | 4.28 | — | — | 1.00 | — |
| 32 | X8R | 92.86 | 7.14 | 4.28 | — | — | 1.50 | — |
| 33 | X9R | 92.01 | 7.99 | 15.98 | — | — | 2.00 | — |
| 34 | X9R | 92.01 | 7.99 | 15.98 | — | — | 4.00 | — |
| 35 | X9R | 96.34 | 3.66 | 7.32 | — | — | — | 1.00 |
| 36 | X9S | 96.34 | 3.66 | 7.32 | — | — | — | 2.00 |
| 37 | X9S | 92.86 | 7.14 | 4.28 | — | — | — | 0.50 |
| 38 | X9R | 92.86 | 7.14 | 14.29 | — | — | — | 0.25 |
| 39 | X9R | 92.86 | 7.14 | 14.29 | — | — | — | 0.50 |
| 40 | X8R | 92.86 | 7.14 | — | — | 4.50 | — | 0.50 |
| 41 | X8R | 92.86 | 7.14 | — | — | 4.50 | 1.00 | — |
| 42 | X8R | 92.86 | 7.14 | — | — | 4.50 | 1.50 | — |
| 43 | X8R | 94.74 | 5.26 | 3.95 | — | — | — | 0.50 |
| 44 | X9S | 94.74 | 5.26 | — | — | — | — | 1.00 |

TABLE 2-continued

Formula & Dielectric Characteristic Table

| | | | | | | | | |
|---|---|---|---|---|---|---|---|---|
| 45 | X9R | 94.74 | 5.26 | 3.29 | — | — | — | 1.00 |
| 46 | X9R | 94.74 | 5.26 | 6.58 | — | — | — | 1.00 |
| 47 | X9R | 94.74 | 5.26 | 10.53 | — | — | — | 1.00 |
| 48 | X9S | 94.74 | 5.26 | 10.53 | — | — | — | 1.00 |
| 49 | X8R | 94.74 | 5.26 | 10.53 | — | — | — | 1.00 |
| 50 | X9R | 92.86 | 7.14 | 4.28 | — | — | — | 0.50 |
| 51 | X9R | 92.86 | 7.14 | 4.28 | — | — | 1.00 | 0.20 |

| Sample | CaO | K | 25° C. DF | −55° C. TCC | 125° C. TCC | 150° C. TCC | 200° C. TCC |
|---|---|---|---|---|---|---|---|
| 1 | — | 1076 | 0.5% | 4.2% | −13.2% | −20.3% | −47.5% |
| 2 | — | 571 | 0.4% | 4.6% | −10.6% | −13.5% | −35.5% |
| 3 | — | 150 | 0.2% | 7.1% | −6.8% | −8.9% | −14.9% |
| 4 | — | 116 | 0.7% | 5.4% | −6.9% | −9.0% | −14.4% |
| 5 | — | 312 | 0.5% | 5.8% | −3.1% | −3.1% | −7.3% |
| 6 | — | 252 | 0.3% | 9.2% | −8.6% | −5.6% | −8.6% |
| 7 | — | 206 | 0.2% | 12.3% | −11.5% | −12.5% | −16.3% |
| 8 | — | 192 | 0.1% | 16.3% | −13.3% | −16.1% | −21.6% |
| 9 | — | 219 | 0.6% | 17.4% | −13.6% | −16.5% | −21.9% |
| 10 | — | 212 | 1.0% | 17.7% | −16.7% | −18.6% | −25.5% |
| 11 | — | 1665 | 1.5% | −11.8% | 12.0% | 1.3% | −34.4% |
| 12 | — | 1346 | 1.2% | −6.7% | 4.2% | 4.9% | −27.6% |
| 13 | — | 569 | 0.4% | −3.1% | −2.0% | −9.9% | −36.4% |
| 14 | — | 755 | 0.5% | −3.8% | −2.5% | −5.2% | −32.1% |
| 15 | — | 870 | 0.6% | −1.0% | 0.4% | −2.6% | −34.3% |
| 16 | — | 903 | 1.0% | 2.0% | 2.6% | −3.9% | −32.8% |
| 17 | — | 1088 | 1.1% | −6.8% | 5.5% | 7.2% | −22.5% |
| 18 | — | 895 | 1.0% | −3.0% | 3.7% | 6.0% | −14.8% |
| 19 | — | 831 | 0.9% | −1.9% | 0.3% | 3.0% | −13.0% |
| 20 | — | 554 | 1.0% | 4.5% | −4.2% | 0.4% | 0.9% |
| 21 | — | 961 | 2.2% | −11.1% | 3.5% | 2.5% | −27.4% |
| 22 | — | 1304 | 1.8% | −10.5% | 2.3% | 44.0% | −24.6% |
| 23 | — | 933 | 0.5% | −7.0% | 0.7% | −2.0% | −29.2% |
| 24 | — | 1040 | 0.7% | −7.9% | 0.8% | −2.8% | −33.2% |
| 25 | 2.00 | 1609 | 1.0% | −8.7% | 3.9% | −3.9% | −46.6% |
| 26 | 2.00 | 1116 | 0.8% | −7.9% | −1.0% | −3.5% | −36.6% |
| 27 | 2.00 | 803 | 0.8% | −3.0% | 1.4% | 4.2% | −11.9% |
| 28 | 4.00 | 776 | 0.6% | −1.6% | −0.7% | 1.9% | −14.5% |
| 29 | 10.00 | 659 | 0.5% | 1.2% | −4.8% | −5.0% | −21.3% |
| 30 | 2.00 | 554 | 0.6% | −0.7% | −5.4% | −6.9% | −26.5% |
| 31 | — | 754 | 0.7% | −3.1% | 1.9% | 0.8% | −19.4% |
| 32 | — | 672 | 0.5% | −3.7% | 4.8% | 3.8% | −15.9% |
| 33 | — | 709 | 0.8% | −1.5% | −0.6% | 2.7% | −7.1% |
| 34 | — | 532 | 1.0% | −1.3% | −0.4% | 3.0% | 0.4% |
| 35 | — | 940 | 1.6% | −3.5% | 11.6% | 13.2% | −11.0% |
| 36 | — | 785 | 2.0% | −2.2% | 13.6% | 18.0% | 5.9% |
| 37 | — | 705 | 0.7% | −3.0% | 2.9% | 2.2% | −18.0% |
| 38 | — | 720 | 1.0% | −1.9% | 0.5% | 3.2% | −13.0% |
| 39 | — | 698 | 1.3% | −1.2% | 5.1% | 8.7% | −7.3% |
| 40 | — | 652 | 0.6% | −7.2% | 1.1% | −0.6% | −27.1% |
| 41 | — | 677 | 0.7% | −7.1% | −0.4% | −3.4% | −28.7% |
| 42 | — | 638 | 0.5% | −6.5% | −0.1% | −2.0% | −27.4% |
| 43 | 2.00 | 1049 | 0.6% | −3.6% | 5.8% | 2.3% | −26.7% |
| 44 | 2.00 | 4720 | 5.4% | −15.8% | 9.2% | 9.2% | −14.6% |
| 45 | 2.00 | 912 | 0.5% | −2.2% | 4.2% | 5.9% | −18.6% |
| 46 | 2.00 | 851 | 0.7% | −0.1% | 8.6% | 10.1% | −11.6% |
| 47 | 2.00 | 952 | 1.1% | −4.4% | 7.5% | 9.3% | −9.0% |
| 48 | 4.00 | 891 | 0.5% | −5.3% | 6.1% | 6.3% | −16.7% |
| 49 | 8.00 | 771 | 0.5% | −2.9% | 1.7% | 0.3% | −24.0% |
| 50 | 2.00 | 730 | 0.9% | −1.2% | 5.2% | 5.6% | −13.1% |
| 51 | — | 789 | 1.0% | 0.1% | 5.9% | 4.4% | −12.7% |

TABLE 3

Formula & Dielectric Characteristic Table

| Sample | EIA Spec. | BaTiO$_3$ | Ba$_2$LiTa$_5$O$_{15}$ | Li$_2$CO$_3$ | SiO$_2$ | CaO | K | 25° C. DF | −55° C. TCC | 150° C. TCC | 200° C. TCC | Resistivity (Ω-cm) |
|---|---|---|---|---|---|---|---|---|---|---|---|---|
| 19 | X9R | 92.01 | 7.99 | 15.98 | — | — | 831 | 0.9% | −1.9% | 3.0% | −13.0% | 0.62 × 10$^{10}$ |
| 27 | X9R | 92.01 | 7.99 | 15.98 | — | 2.00 | 803 | 0.8% | −3.0% | 4.2% | −11.9% | 3.6 × 10$^{10}$ |
| 28 | X9R | 92.01 | 7.99 | 15.98 | — | 4.00 | 776 | 0.6% | −1.6% | 1.9% | −14.5% | 5.9 × 10$^{10}$ |
| 29 | X8R | 92.01 | 7.99 | 15.98 | — | 10.00 | 659 | 0.5% | 1.2% | −5.0% | −21.3% | 16.0 × 10$^{10}$ |
| 52 | X8R | 94.74 | 5.26 | 3.00 | — | 2.00 | 1044 | 0.4% | −5.2% | −6.2% | −34.8% | 1.5 × 10$^{10}$ |

TABLE 3-continued

Formula & Dielectric Characteristic Table

| Sample | EIA Spec. | BaTiO$_3$ | Ba$_2$LiTa$_5$O$_{15}$ | Li$_2$CO$_3$ | SiO$_2$ | CaO | K | 25° C. DF | −55° C. TCC | 150° C. TCC | 200° C. TCC | Resistivity (Ω-cm) |
|---|---|---|---|---|---|---|---|---|---|---|---|---|
| 53 | X8R | 94.74 | 5.26 | 3.00 | 1.00 | 2.00 | 1123 | 0.6% | −6.58% | −4.8% | −33.3% | 1.9 × 10$^{10}$ |
| 54 | X8R | 94.74 | 5.26 | 3.00 | 1.50 | 2.00 | 1128 | 0.6% | −5.7% | −5.7% | −33.5% | 4.0 × 10$^{10}$ |

Figure 3:
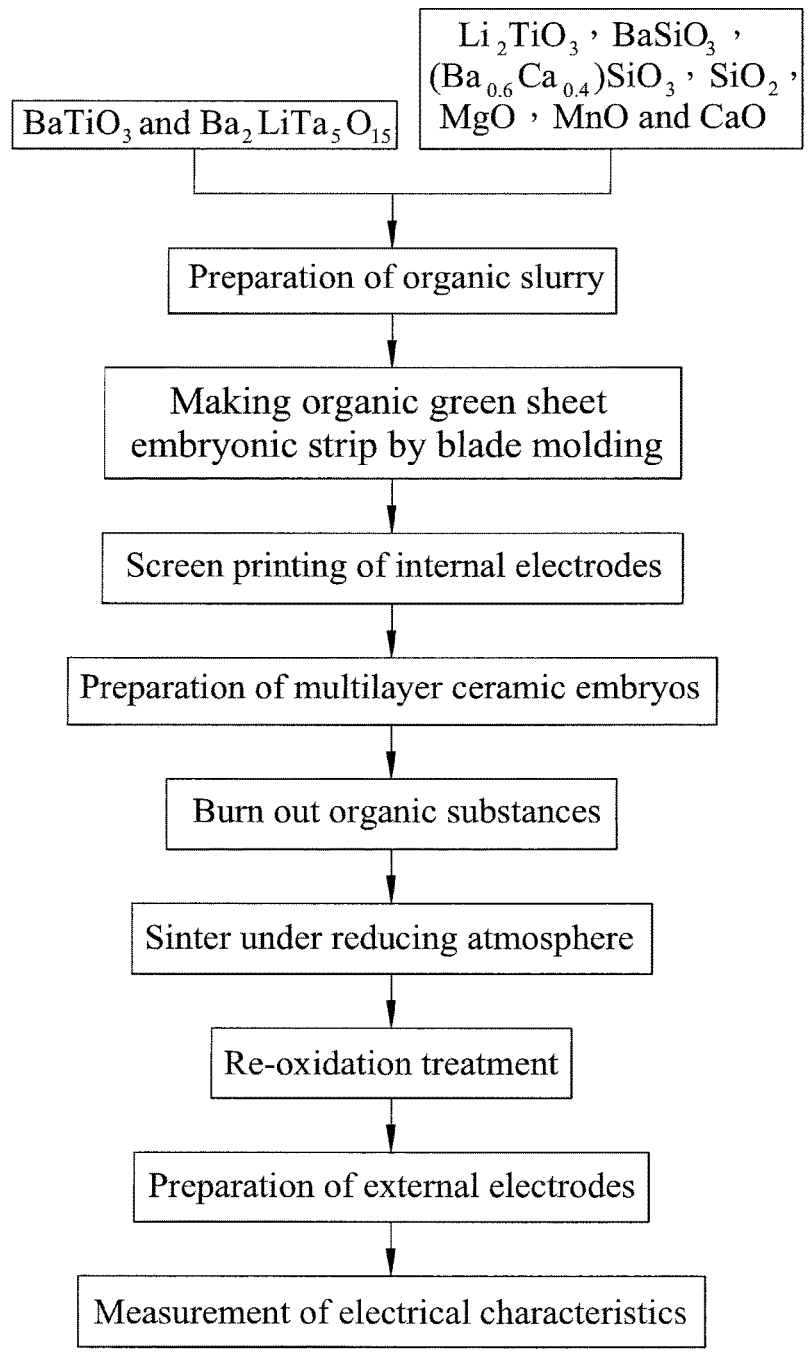
FIG. 3 is a multilayer ceramic capacitor (MLCC) preparation flow chart in accordance with the present invention.
Figure 4:
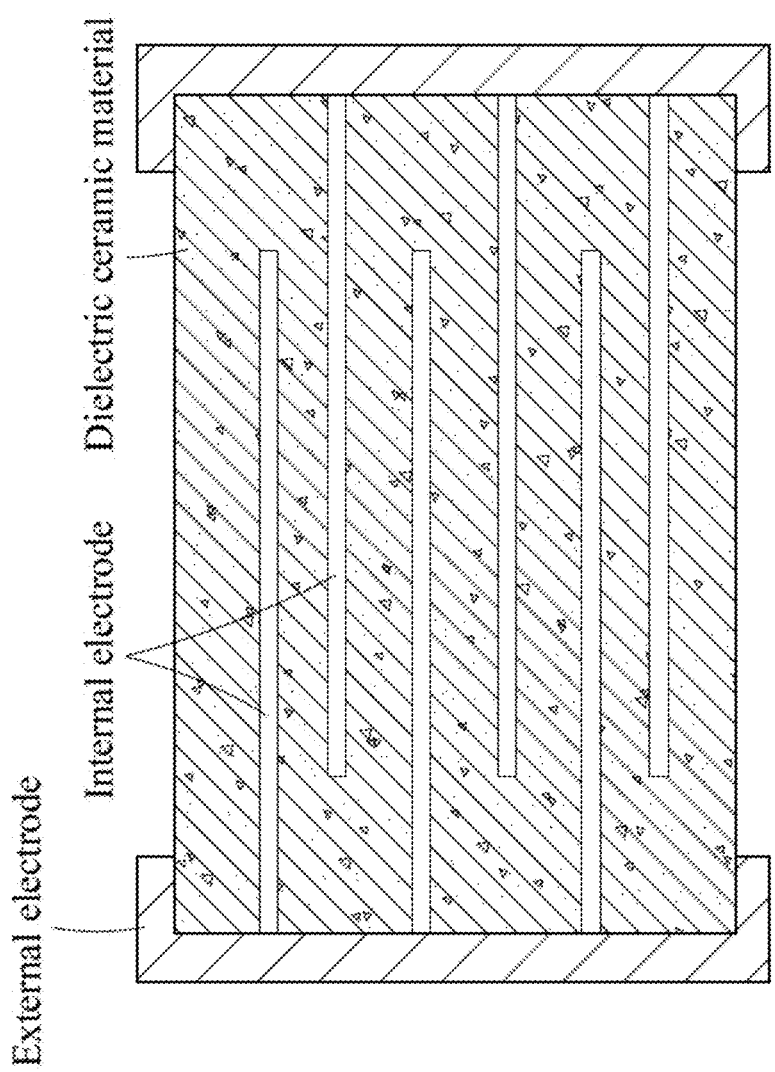
FIG. 4 is a sectional view of a multilayer ceramic capacitor (MLCC) made according to the present invention.

Referring to FIG. 3 and FIG. 4, during the preparation of a multilayer ceramic capacitor, prepare a composite ceramic powder material by mixing main components (BaTiO$_3$ and Ba$_2$LiTa$_5$O$_{15}$) and at least one oxide subcomponent (Li$_2$TiO$_3$, BaSiO$_3$, (Ba$_{0.6}$Ca$_{0.4}$)SiO$_3$, SiO$_2$, MgO, MnO and CaO) according to the formulas of Table 2 and Table 3, and calculating the amount of each component based on the measurement unit of 100 moles prior to mixing. After obtained the expected composition ratio, add toluene, ethanol, plasticizers, adhesives and dispersants to the prepared composite dielectric ceramic powder sample to make a ceramic slurry, and then use a blade molding method to mold the ceramic slurry into thin ceramic green sheets of thickness 30 μm, and then use a screen-printing technique to print commercial Ag, Pd or Ni metal paste on the thin ceramic green sheets embryonic strips subject to a predetermined internal electrode pattern. Thereafter, stack up the internal electrode pattern-printed thin ceramic green sheets embryonic strips, and then apply a hot water pressure to compress the stack of internal electrode pattern-printed thin ceramic green sheets embryonic strips tightly, and then cut the compressed stack of internal electrode pattern-printed thin ceramic green sheets into individual multilayer ceramic embryos, and then heat the multilayer ceramic embryo under pure N$_2$ environment at 330° C.~500° C. (at the heating rate of 2° C./min) for 6~12 hours to burn out organic substances completely, and then sinter the multilayer ceramic embryos under the composition of the reducing atmosphere of 98% N$_2$-2% H$_2$ and 35° C. saturated steam at 1000° C.~1400° C. (at the heating rate of 3° C./min) for 2 hours, and then reduce the temperature to 900° C.~1050° C. (at the cooling rate of 4° C./min) to receive a re-oxidation temperature heat treatment under the environment of 60 ppm~150 ppm oxygen pressure or the atmospheric environment, and then slowly lower to room temperature to obtain multilayer ceramic mature embryos. Thereafter, print Ag or Cu external electrode slurry on the multilayer ceramic mature embryos over the exposed opposite ends of the internal electrodes, and then increase the temperature to about 800° C.~900° C. under pure N$_2$ environment (at the heating rate of 15° C./min), and then cool the furnace to room temperature to complete the preparation of multilayer ceramic capacitor (MLCC) samples (see FIG. 4).

Figure 5:
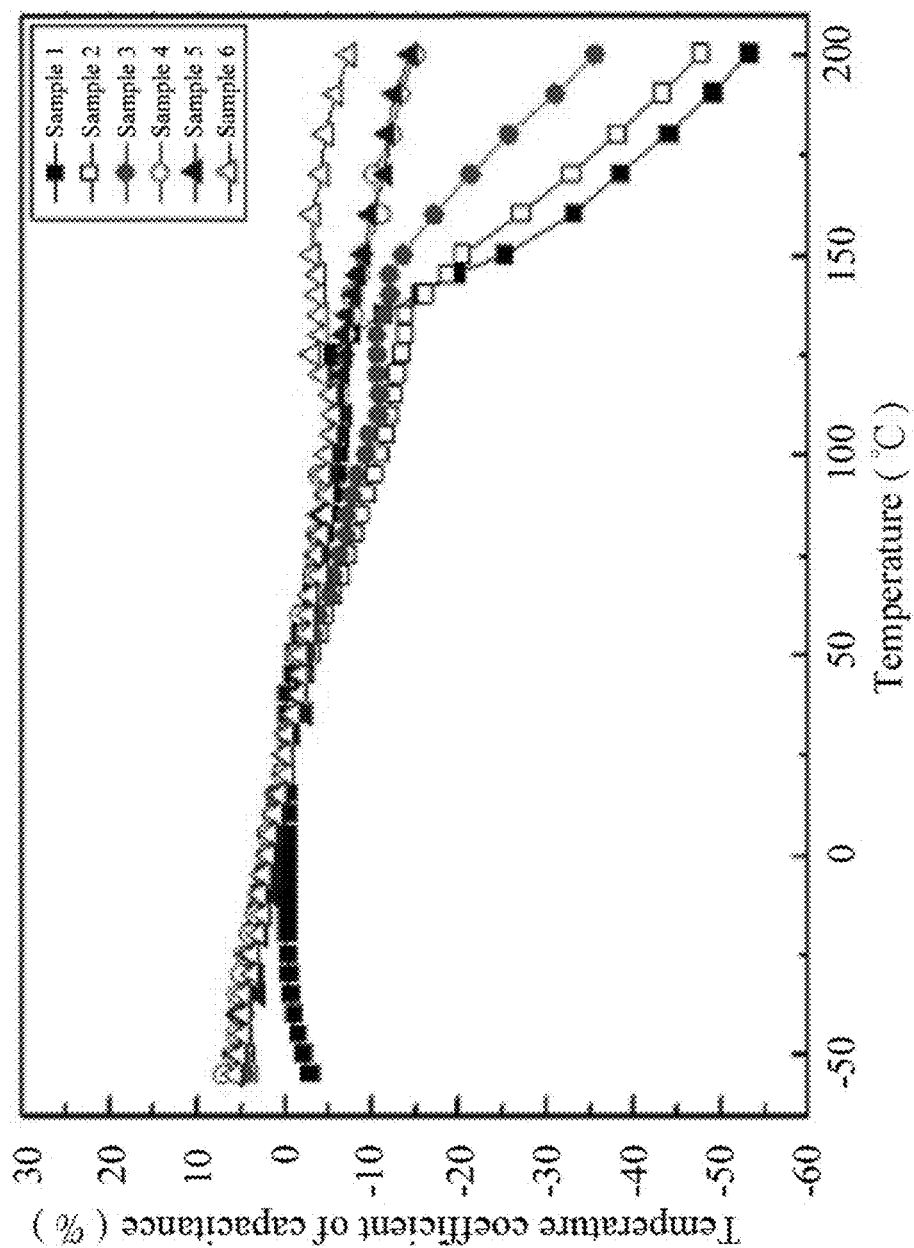
FIG. 5 is a dielectric characteristic measurement diagram of the composite dielectric ceramic material samples numbers 1~6 in accordance with the present invention.
Figure 6:
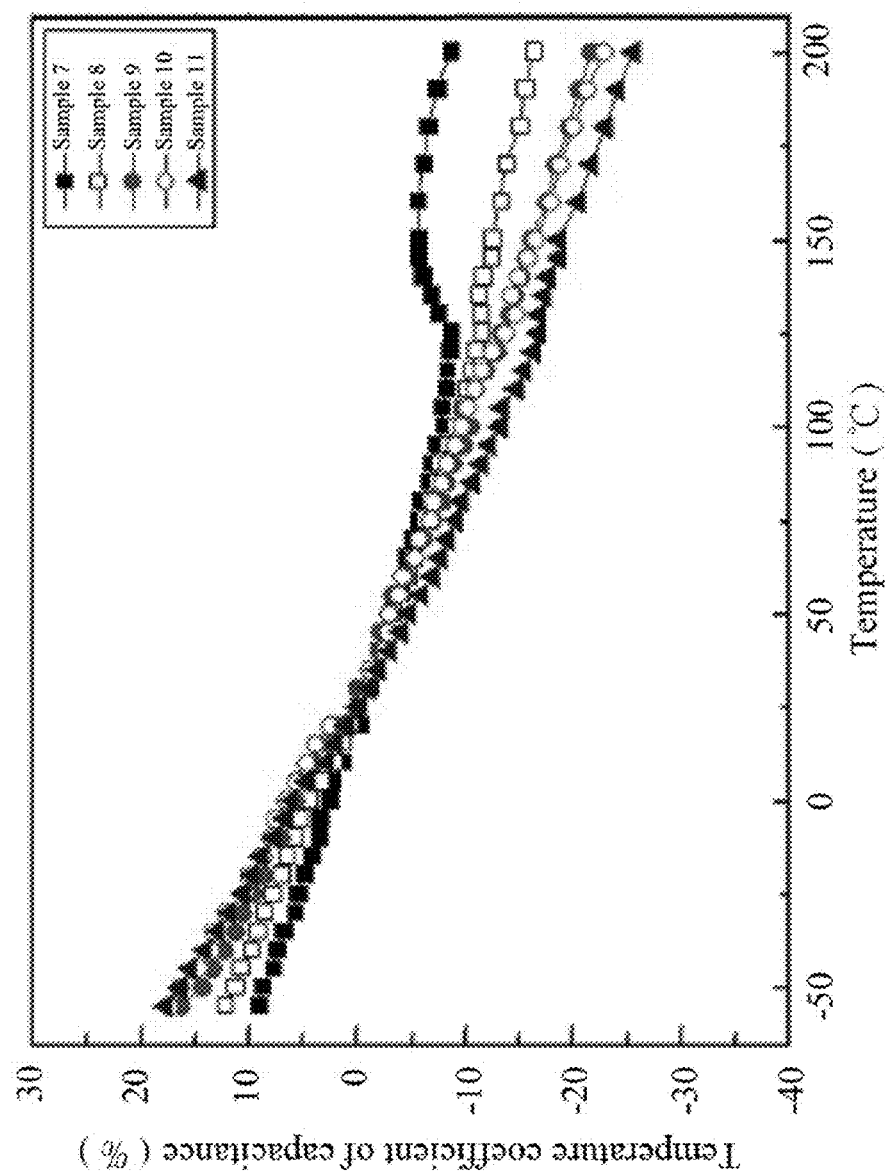
FIG. 6 is a dielectric characteristic measurement diagram of the composite dielectric ceramic material samples numbers 7~11 in accordance with the present invention.

Referring to FIGS. 5~8, dielectric characteristic measurement diagrams of the composite dielectric ceramic material samples numbers 1~6, samples numbers 7~11, samples numbers 13~16 and samples numbers 12, 18, 19, 33-36 and 38~39 in accordance with the present invention are illustrated. The dielectric ceramic material samples numbers 1~6 illustrated in FIG. 5 and the dielectric ceramic material samples numbers 7~10 illustrated in FIG. 6 are prepared according to the multilayer ceramic capacitor (MLCC) preparation method of the present invention, however, only the main components BaTiO$_3$ and Ba$_2$LiTa$_5$O$_{15}$ contain no any oxide subcomponent. The objective is to show the overall dielectric characteristics and electrical properties of the composite dielectric ceramic material of the present invention under the effect of oxide subcomponents. Further, when measuring the prepared composite dielectric ceramic capacitor samples 1~54, use a LCR meter to measure temperature coefficient of capacitance (TCC) curve of every composite dielectric ceramic capacitor sample, and then apply AC 1V at 1 kHz to measure the variation of capacitance value relative to temperature at −55° C.~200° C. and the dielectric-loss factor (DF) at room temperature.

From the dielectric ceramic material samples numbers 1~6 illustrated in FIG. 5 and the dielectric ceramic material samples numbers 7~10 illustrated in FIG. 6, we can see that increasing the proportion of Ba$_2$LiTa$_5$O$_{15}$ can get composite dielectric ceramic capacitors that have the TCC (temperature-current characteristic) curve gradually stabilized at high temperature range (150° C.~200° C.). However, the measurement results of Table 2 show that the dielectric constants (k-values) of the samples have been significantly lowered with the adding of Ba$_2$LiTa$_5$O$_{15}$. Further, from the measurement results shown in FIG. 6 and Table 2, we can see that sample 11 has the characteristics of dielectric temperature stability and high dielectric constant (k-value). The dielectric constant (k-value) of sample 11 is even slightly better than sample 1.

Figure 7:
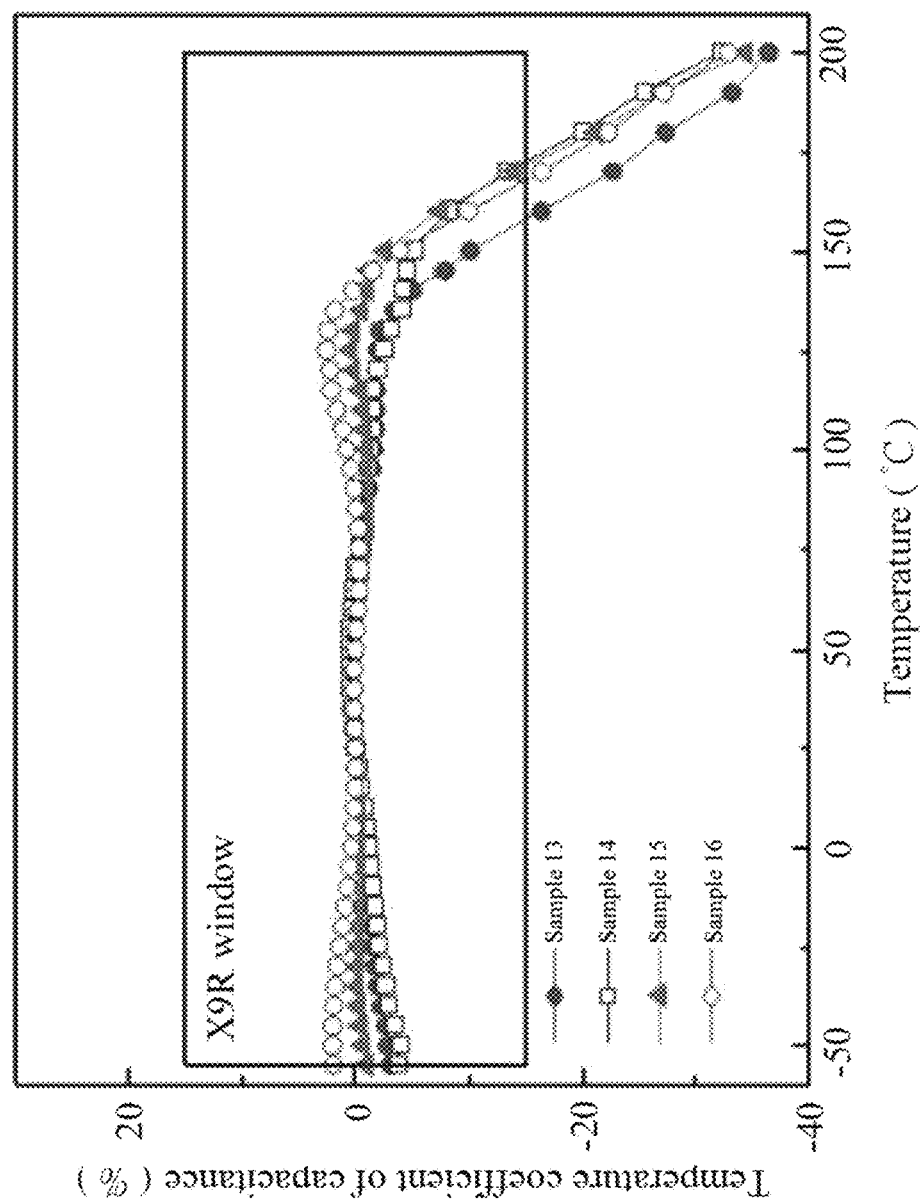
FIG. 7 is a dielectric characteristic measurement diagram of the composite dielectric ceramic material samples numbers 13~16 in accordance with the present invention.

Referring to Table 2 and FIG. 7, measurement results of samples 13~16 are illustrated. From these measurement results, we can see that when the subcomponent of Li$_2$TiO$_3$ is selected, it not only can provide a sintering promotion effect but also can flatten the TCC curve. In the example of 100 moles composite dielectric ceramic material based on the main component of (1-x)(BaTiO$_3$)-x(Ba$_2$LiTa$_5$O$_{15}$) and containing 94.74 moles BaTiO$_3$ and 5.26 moles Ba$_2$LiTa$_5$O$_{15}$, when the ratio of the oxide subcomponent Li$_4$TiO$_3$ corresponding to 100 moles main component was in the range of 1.0~7.0 moles, the dielectric constant (k-value) was relatively increased from 569 to 755, 870 and 903 with an increase in the added amount of the oxide subcomponent Li$_2$TiO$_3$. Although the TCC curve falls within the norms of the EIA-X8R specification when the added amount of Li$_2$TiO$_3$ is in the range of 1.0~7.0 moles, but by the temperature coefficient of capacitance (TCC) value at 200° C., we can know that, when the added amount of Li$_2$TiO$_3$ was 3 moles, the highest value of the TCC value was obtained, and the TCC curve was slightly stabilized.

Further, in the example of 100 moles composite dielectric ceramic material with 94.74 moles BaTiO$_3$ and 5.26 moles Ba$_2$LiTa$_5$O$_{15}$ where BaSiO$_3$ was used as oxide subcomponent, as indicated in Table 2, sample numbers 21~22, when the ratio of the oxide subcomponent BaSiO$_3$ was increased from 2.31 moles to 4.62 moles, the dielectric constant (k-value) was relatively increased from 961 to 1304 and the temperature coefficient of capacitance (TCC) value at 200° C. was relatively increased with the increase in the added amount. Although increasing the amount of the oxide subcomponent BaSiO$_3$ can effectively promote the low temperature sintering densification, the temperature coefficient of capacitance (TCC) value at 150° C. surpassed over +15% when 4.62 moles $BaSiO_3$ was added, the overall TCC curve simply falls within the norms of the EIA-X7R specification.

Similarly, when $(Ba_{0.6}Ca_{0.4})SiO_3$ was used as an oxide subcomponent, as indicated in Table 2, sample numbers 23~24, it achieved the same effect of lifting the dielectric constant (k-value). When the added amount of oxide subcomponent $(Ba_{0.6}Ca_{0.4})SiO_3$ was increased from 2.25 moles to 4.50 moles, the dielectric constant (k-value) simply lifted from 933 to 1040; unlike the adding of $BaSiO_3$, increasing the added amount of $(Ba_{0.6}Ca_{0.4})SiO_3$ still enabled the overall TCC curve to fall within the norms of the EIA-X8R specification while the dielectric loss factor (DF) value was maintained below 1.0%. In short, selecting $(Ba_{0.6}Ca_{0.4})SiO_3$ as oxide subcomponent is better than $BaSiO_3$ in dielectric temperature stability.

In the samples illustrated in Table 2, first, second and third oxide subcomponents were used to define each subcomponent, i.e., except the use of one unary oxide subcomponent, a second oxide subcomponent or two or more than two other oxide subcomponents can be added. For example, samples 12, 18, 19, 33~36 and 38~39 illustrated in Table 2 and FIG. 8 contained a second subcomponent and other subcomponents, showing lifted temperature coefficient of capacitance (TCC) value in the temperature range of −55° C.~200° C., i.e., these samples have the characteristic of dielectric temperature stability. More particularly, when multiple different oxide subcomponents were added, the variation trend of the temperature coefficient of capacitance (TCC) value and curve was more in line with EIA-X9R specification. If we consider the complex chemical reactions and interactions among the various components during the sintering process, it is difficult to predict the amazing technical effects of the oxide subcomponents formulated in accordance with the present invention.

Figure 8:
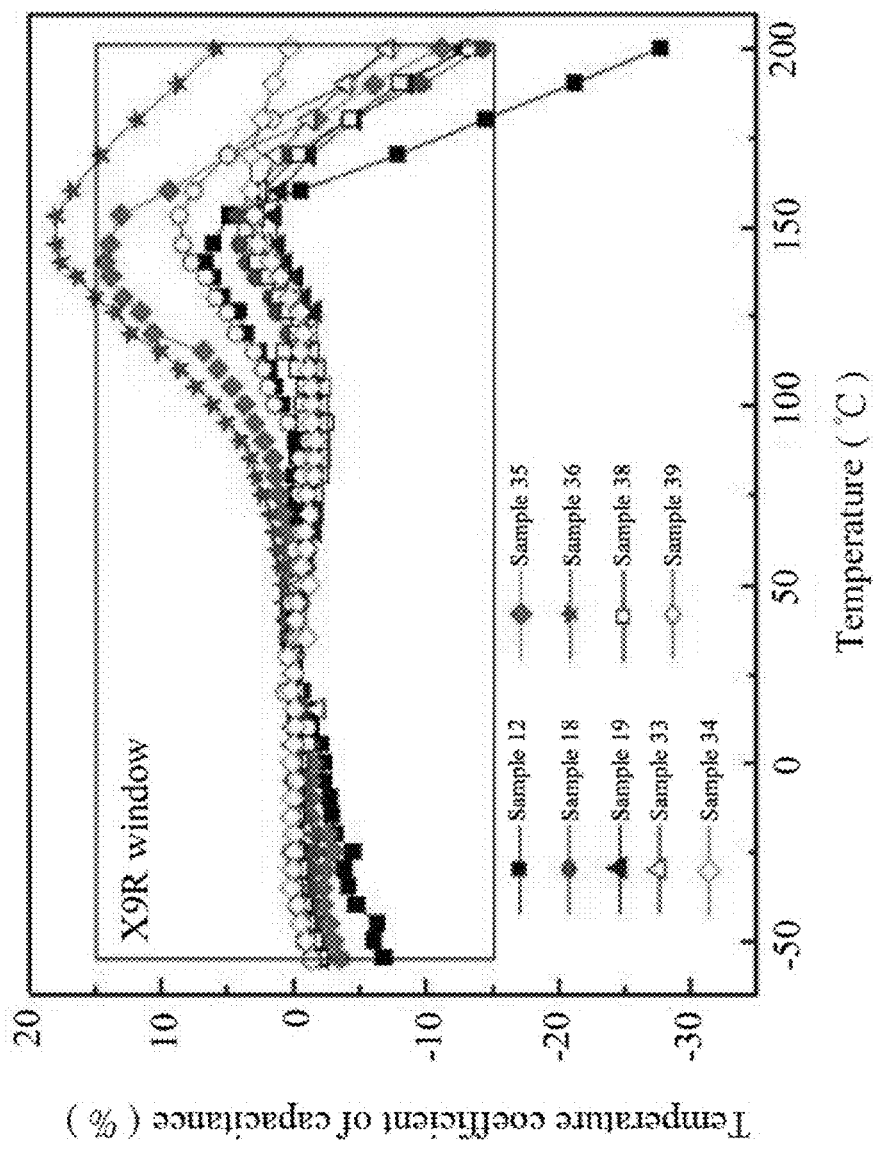
FIG. 8 is a dielectric characteristic measurement diagram of the composite dielectric ceramic material samples numbers 12, 18, 19, 33~36 and 38~39 in accordance with the present invention.

Referring to Table 2 and FIG. 8, samples 12, 18, 19, 33~36 and 38~39 are illustrated. Sample 12 contained main components 96.34 moles $BaTiO_3$-3.66 moles $Ba_2LiTa_5O_{15}$, and a first oxide subcomponent 7.32 moles $Li_2TiO_3$ as a sintering aid. Samples 35~36 were based on sample 12 with 1 mole and 2 moles second oxide subcomponent MnO respectively added. With the adding of the said different amounts of the second oxide subcomponent MnO, the dielectric constant (k-value) was reduced from 1346 to 940 and 785 respectively, however, the temperature coefficient of capacitance (TCC) values of these two samples in the temperature range of −55° C.~200° C. were lifted to positive values, obtaining the characteristic of dielectric temperature stability. Sample 18 contained main components 92.86 moles $BaTiO_3$-7.14 moles $Ba_2LiTa_5O_{15}$, and a first oxide subcomponent 14.29 moles $Li_2TiO_3$ as a sintering aid. Samples 38~39 were based on sample 18 with 0.25 mole and 0.50 mole second oxide subcomponent MnO respectively added. These samples achieved the same effects as samples 12 and 35~36, i.e., with the adding of the said different amounts of the second oxide subcomponent MnO, the dielectric constant (k-value) was reduced from 895 to 720 and 698 respectively, however, the temperature coefficient of capacitance (TCC) values of these two samples in the temperature range of −55° C.~200° C. were lifted to positive values, obtaining the characteristic of dielectric temperature stability. Therefore, adding the second oxide subcomponent MnO can effectively lift the temperature coefficient of capacitance (TCC) value in the temperature range of −55° C.~200° C., but, the most appropriate amount of the second oxide subcomponent MnO must be relatively adjusted in accordance with the molar proportion of the main components, otherwise the temperature coefficient of capacitance (TCC) value will exceed the range of +15%.

Referring to Table 2 and FIG. 7, samples 19 and 33~34 are illustrated. As illustrated, when MgO was used as the second oxide subcomponent instead of MnO, an effect similar to the use of MnO was obtained. Sample 19 contained main components 92.01 moles $BaTiO_3$-7.99 moles $Ba_2LiTa_5O_{15}$, and a first oxide subcomponent 15.98 moles $Li_2TiO_3$ as a sintering aid. Samples 33-34 were based on sample 19 with 2 moles and 4 moles second oxide subcomponent MgO respectively added. With the adding of the said different amounts of the second oxide subcomponent MgO, the dielectric constant (k-value) was reduced from 831 to 709 and 532 respectively, however, the temperature coefficient of capacitance (TCC) values of these two samples in the temperature range of −55° C.~20° C. were shifted to 0%, obtaining the characteristic of dielectric temperature stability. Therefore, adding MgO can effectively inhibit the dielectric characteristic of the main component $(1-x)(BaTiO_3)$-x $(Ba_2LiTa_5O_{15})$ in the temperature range of −55° C.~200° C. and flatten the rate of change of the TCC curve.

Further, as indicated by samples 19 and 27~29 shown in Table 2 and FIG. 8, when CaO was used as the second oxide subcomponent, the anti-reduction ability of the dielectric ceramic material based on the main component of $(1-x)$ $(BaTiO_3)$-$x(Ba_2LiTa_5O_{15})$ was improved, and the rate of change of the TCC curve was flattened with an increase in the added amount of CaO. Sample 19 contained main components 92.01 moles $BaTiO_3$-7.99 moles $Ba_2LiTa_5O_{15}$, and a first oxide subcomponent 15.98 moles $Li_2TiO_3$ as a sintering aid. Samples 27~29 were based on sample 19 with 2 moles, 4 moles and 10 moles second oxide subcomponent CaO respectively added. With the adding of the said different amounts of the second oxide subcomponent CaO, the dielectric constant (k-value) was reduced from 831 to 803, 776 and 659 respectively, the dielectric loss factor (DF) value was reduced from 0.9% to 0.8%, 0.6% and 0.5% respectively, the TCC curves of these samples in the temperature range of −55° C.~200° C. were shifted off-center, and the temperature coefficient of capacitance (TCC) values of these samples in the temperature range of −55° C.~200° C. were reduced from −11.9% of 2 moles CaO to −14.5% of 4 moles CaO and −21.3% of 10 moles CaO.

Further, according to samples 19 and 27~29 as illustrated in Table 3, an increase in the added amount of the second oxide subcomponent CaO, we can observed a continuous increase in the resistivity. Samples 27~29 were based on sample 19 with 2 moles, 4 moles and 10 moles second oxide subcomponent CaO respectively added. With the adding of the said different amounts of the second oxide subcomponent CaO, the resistivity was increased from $0.62 \times 10^{10}$ Ω-cm to $3.6 \times 10^{10}$ Ω-cm, $5.9 \times 10^{10}$ Ω-cm and $16.0 \times 10^{10}$ Ω-cm respectively. However, to avoid a large decline in dielectric constant (k-value), the amount of CaO should be between 0.1 to 10.0 moles and should not exceed 10.0 moles.

Further, according to samples 52, 53 and 54 illustrated in Table 3, using $SiO_2$ as oxide subcomponent can also achieve the effects of maintaining the dielectric constant (k-value) and increasing the coefficient of resistance. Sample 52 contained main components 94.74 moles $BaTiO_3$-5.26 moles $Ba_2LiTa_5O_{15}$, a first oxide subcomponent 3 moles $Li_2TiO_3$ and a second oxide subcomponent 2 moles CaO. Samples 53~54 were based on sample 52 with 1 mole and 1.5 moles third oxide subcomponent $SiO_2$ respectively added. With the adding of the said different amounts of the third oxide subcomponent $SiO_2$, the resistivity was increased from $1.5\times10^{10}$ Ω-cm to $1.9\times10^{10}$ Ω-cm and $4.0\times10^{10}$ Ω-cm respectively, achieving the effects of promoting sintering densification, improving the anti-reduction ability, enhancing dielectric temperature stability and avoiding deterioration and failure due to dielectric loss.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A composite dielectric ceramic material comprising:
   main components of $BaTiO_3$ and $Ba_2LiTa_5O_{15}$; and
   $Li_2TiO_3$ to improve the dielectric characteristics of said main components, an amount of said $Li_2TiO_3$ is in the range of 0.1~30 moles corresponding to 100 moles of said main components.

2. The composite dielectric ceramic material as claimed in claim 1, further comprising a unary oxide selected from the group of MnO, MgO, CaO, $SiO_2$ and their combinations, the added amount of said unary oxide is in the range of 0.1~10.0 moles.

3. The composite dielectric ceramic material as claimed in claim 2, wherein the rate of change of the TCC curve in the temperature range of 150~200° C. is between ±15.0%.

* * * * *